United States Patent
Ache et al.

(10) Patent No.: US 12,347,937 B2
(45) Date of Patent: Jul. 1, 2025

(54) SPACEBORNE ANTENNA WITH ROLLING FLEX HINGES AND ASSOCIATED METHODS

(71) Applicant: Eagle Technology, LLC, Melbourne, FL (US)

(72) Inventors: Michael J. Ache, West Melbourne, FL (US); Stephen Jenkins, Palm Bay, FL (US); Robert M. Taylor, Rockledge, FL (US); Alec Guenther, West Melbourne, FL (US); Kyle Whybrew, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 141 days.

(21) Appl. No.: 18/325,662

(22) Filed: May 30, 2023

(65) Prior Publication Data
US 2024/0405419 A1 Dec. 5, 2024

(51) Int. Cl.
*H01Q 1/28* (2006.01)
*H01Q 1/08* (2006.01)
*H01Q 3/04* (2006.01)

(52) U.S. Cl.
CPC .............. *H01Q 3/04* (2013.01); *H01Q 1/08* (2013.01); *H01Q 1/288* (2013.01)

(58) Field of Classification Search
CPC ........ H01Q 1/08; H01Q 1/1235; H01Q 1/288; H01Q 15/161
See application file for complete search history.

(56) References Cited

U.S. PATENT DOCUMENTS

| 3,592,069 A | 7/1971 | Welch |
| 5,086,541 A | 2/1992 | Auternaud et al. |

(Continued)

FOREIGN PATENT DOCUMENTS

| CN | 108767416 | | 11/2018 |
| CN | 110518328 A | * | 11/2019 |
| DE | 4032112 | | 4/1992 |

OTHER PUBLICATIONS

Pelligrino et al. "SAR Advanced Deployable Structure" CUED/D-STRUCT/TR191: http://www.its.caltech.edu/~sslab/PUBLICATIONS/SAR%20Advanced%20Deployable%20Structure_2000.pdf; pp. 57.

(Continued)

*Primary Examiner* — Daniel Munoz
(74) *Attorney, Agent, or Firm* — ALLEN, DYER, DOPPELT + GILCHRIST, P.A.

(57) ABSTRACT

A spaceborne antenna for a satellite may include antenna sections for the satellite, and at least one rolling flex hinge rotatably coupling first and second antenna sections together and permitting rotation between a stored position and a deployed position. The first and second antenna sections may be stacked in the stored position and extended in end-to-end relation in the deployed position. The at least one rolling flex hinge may include a first hinge body coupled to an end of the first antenna section, a second hinge body coupled to an end of the second antenna section, and a flexible strap arrangement coupling the first hinge body and second hinge body together to permit rolling contact therebetween. At least one locking linkage may be coupled between the first and second hinge bodies to lock the first and second hinge bodies when the first and second antenna sections are in the deployed position.

28 Claims, 9 Drawing Sheets

(56) References Cited

U.S. PATENT DOCUMENTS

| | | | | |
|---|---|---|---|---|
| 5,673,459 | A | * | 10/1997 | Baghdasarian ........ H01Q 1/288 244/172.6 |
| 8,151,414 | B2 | | 4/2012 | Baudasse et al. |
| 8,562,236 | B2 | | 10/2013 | Eikelenboom |
| 2007/0094847 | A1 | * | 5/2007 | Thomson ............. B64G 1/2229 16/369 |
| 2018/0049336 | A1 | * | 2/2018 | Manuel ................... F16C 11/04 |
| 2018/0297720 | A1 | | 10/2018 | Fraux et al. |

OTHER PUBLICATIONS

Watt et al. "Tape-Spring Rolling Hinges" Proceedings of 36 Aerospace Mechanisms Symposium, Glenn Research Center, May 15-17, 2002; pp. 18.

Halverson et al. "Tension-based Multi-stable Compliant Rolling-contact Elements" Journal of Mech. and Machine Theory, Feb. 1, 2010; pp. 8.

Nelson et al. "Developable compliant-aided rolling-contact mechanisms" Journal of Mech. and Machine Theory: Aug. 1, 2018; pp. 19.

Wang et al. "Folded strains of a bistable composite tape-spring" International Journal of Solids and Structures: vol. 233, Dec. 15, 2021; pp. 17.

Pehrson et al. "TRAC-Spring Guided Hinges" proceedings of AIAA SciTech Forum, San Diego, CA, Jan. 3-7, 2022: https://www.researchgate.net/publication/357558689_TRAC-Spring_Guided_Hinges; pp. 21.

* cited by examiner

SPACEBORNE ANTENNA WITH ROLLING FLEX HINGES AND ASSOCIATED METHODS

TECHNICAL FIELD

The present disclosure relates to spaceborne antennas for a satellite, and more particularly, to a rolling flex hinge used in a spaceborne antenna having a stored position and a deployed position.

BACKGROUND

Large spaceborne antennas often need to be collapsed to a compact form to fit in the constrained volume of a launch vehicle. Transitioning antenna structures from a collapsed form to a fully deployed shape is based upon the use of hinges and other mechanisms to fold the mechanical structures that support the feeds and reflective surfaces of large antennas.

Such antennas may also need to be stiff in their deployed shape to allow spacecraft maneuvering and maintain a precise antenna geometry. Cords are used between rigid structures to form tension truss structures that are both stiff and very lightweight.

In such instances, it may be desirable to have a rotation axis between two stiff structures that deploys and locks in position without exceeding the final locked dimension to avoid overstretching other components. In addition, when multiple panels with significant thickness are folded back and forth, it may be desirable to be able to deploy the panels without gaps between adjacent panels.

SUMMARY

A spaceborne antenna for a satellite may comprise a plurality of antenna sections for the satellite, and at least one rolling flex hinge rotatably coupling first and second antenna sections together and permitting rotation between a stored position and a deployed position. The first and second antenna sections may be stacked in the stored position and extended in end-to-end relation in the deployed position.

The at least one rolling flex hinge may comprise a first hinge body coupled to an end of the first antenna section, a second hinge body coupled to an end of the second antenna section, and a flexible strap arrangement coupling the first hinge body and second hinge body together to permit rolling contact therebetween. At least one locking linkage may be coupled between the first and second hinge bodies to lock the first and second hinge bodies when the first and second antenna sections are in the deployed position.

The at least one locking linkage may comprise a plurality of spaced apart locking linkages. Each locking linkage may comprise a first linkage pivotally coupled to the first hinge body, and a second linkage pivotally coupled to the second hinge body. The first and second linkages may be pivotally coupled together.

Each locking linkage may comprise a first magnet carried by the first linkage, and a second magnet carried by the second linkage. The first and second magnets couple together to lock the first and second hinge bodies when the first and second antenna sections are in the deployed position.

The at least one rolling flex hinge may comprise a stop to stop the rolling contact between the first and second hinge bodies when the first and second hinge bodies are locked.

The stop may comprise a dowel pin carried by a rolling surface of the first hinge body, and a set screw carried by a rolling surface of the second hinge body. The set screw contacts the dowel pin when the first and second antenna sections are in the deployed position.

The flexible strap arrangement may comprise at least one first flexible strap coupled between the first and second hinges, and at least one second flexible strap coupled between the first and second hinges and non-overlapping with the at least one first flexible strap.

The respective rolling surfaces of the first and second hinge bodies may include respective grooves for receiving the at least one first and second flexible straps.

The at least one rolling flex hinge may comprise a plurality of spaced apart rolling flex hinges rotatably coupling the first and second antenna sections together.

Another aspect is directed to a rolling flex hinge for a spaceborne antenna comprising first and second antenna sections. The rolling flex hinge permits rotation of the first and second antenna sections between a stored position and a deployed position. The rolling flex hinge may include a first hinge body coupled to an end of the first antenna section, a second hinge body coupled to an end of the second antenna section, and a flexible strap arrangement coupling the first hinge body and second hinge body together to permit rolling contact therebetween. The first and second antenna sections may be stacked in the stored position and extended in end-to-end relation in the deployed position. At least one locking linkage may be coupled between the first and second hinge bodies to lock the first and second hinge bodies when the first and second antenna sections are in the deployed position.

Yet another aspect is directed to a method for making a rolling flex hinge for a spaceborne antenna as described above.

DETAILED DESCRIPTION

The present description is made with reference to the accompanying drawings, in which exemplary embodiments are shown. However, many different embodiments may be used, and thus the description should not be construed as limited to the particular embodiments set forth herein.

Rather, these embodiments are provided so that this disclosure will be thorough and complete. Like numbers refer to like elements throughout.

Figure 1:
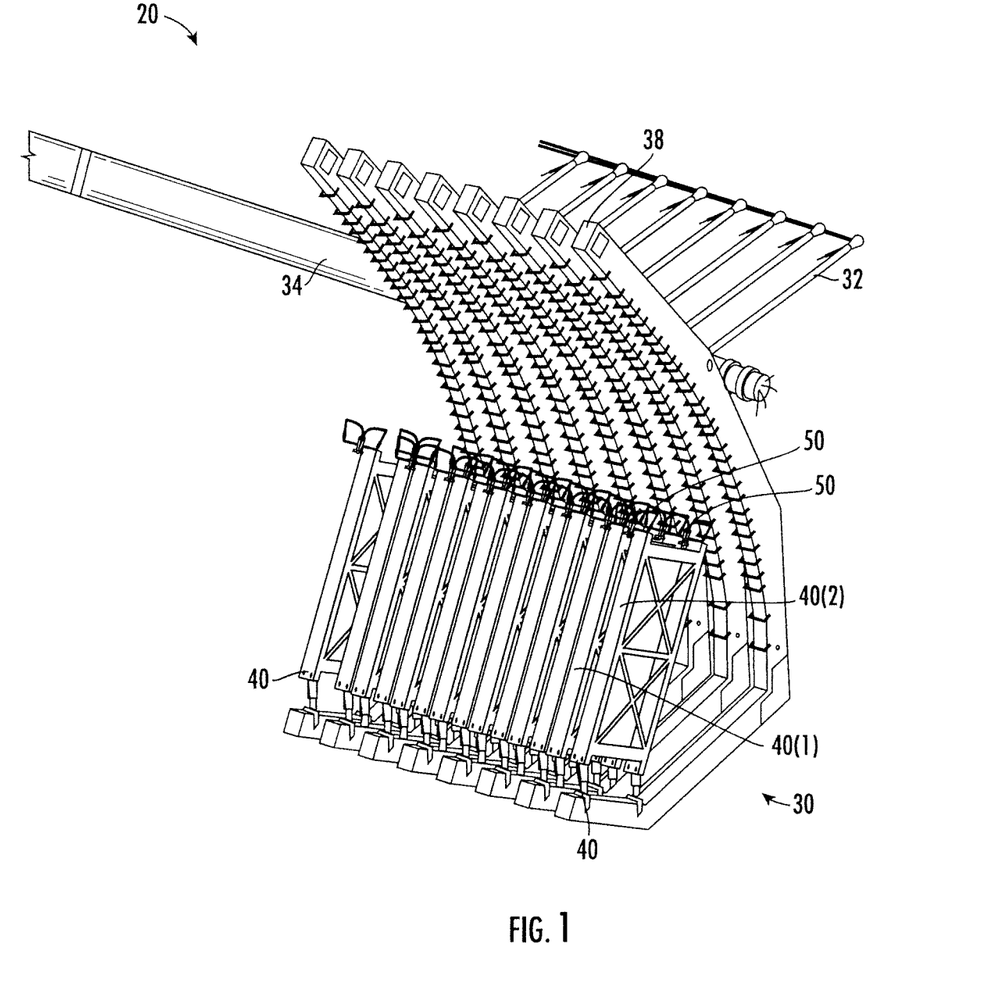
FIG. 1 is a partial front perspective view of a spaceborne antenna for a satellite in a stored position in which various aspects of the disclosure may be implemented.
Figure 2:
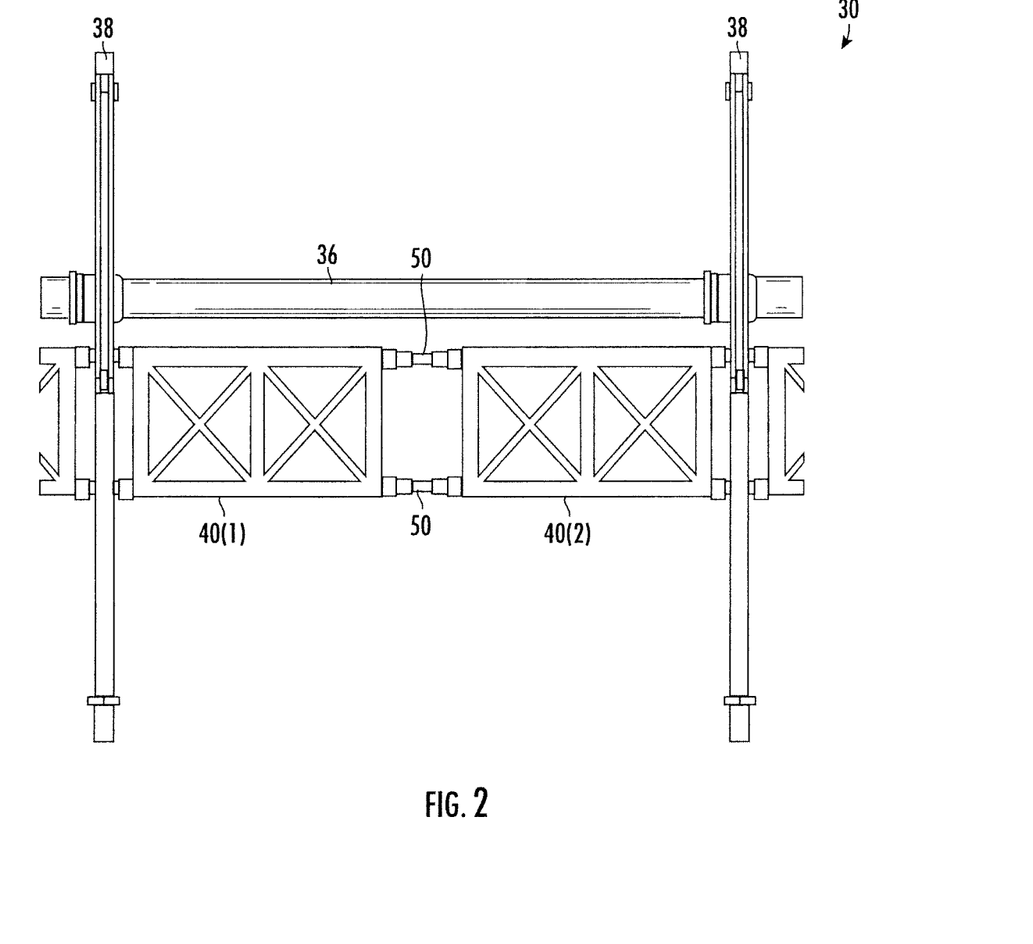
FIG. 2 is a partial top view of the spaceborne antenna illustrated in FIG. 1 in a deployed position.

Referring initially to FIGS. 1 and 2, a spaceborne antenna 30 for a satellite 20 will be discussed. A partial perspective view of the spaceborne antenna 30 in a stored position is provided in FIG. 1, and a partial top view of the spaceborne antenna 30 in a deployed position is provided in FIG. 2.

The spaceborne antenna 30 includes at least one telescoping boom 34 carried by a support structure. The telescoping boom 34 includes a plurality of telescoping sections 36 which can collapse the spaceborne antenna 30 to the stored position or expand the spaceborne antenna 30 to the deployed position.

Coupled to the telescoping sections 36 are a plurality of bulkheads 38. The bulkheads 38 structurally support one or more flexible elements so as to provide a parabolic trough shaped surface when the telescoping boom 34 is expanded. The flexible elements are not shown to simplify the figures.

The bulkheads 38 carry a plurality of antenna sections 40. Each antenna section 40 includes one or more radiating elements to form an array. In a deployed positon, radiating elements are arranged to face a concave surface of the parabolic trough shaped surface that is intended to concentrate RF energy in a desired pattern. The radiating elements can include, but are not limited to, patch antennas, dipole antennas, monopole antennas, horns, and helical coils.

A size of the antenna sections 40 may depend on a desired footprint of the satellite antenna 30. In one embodiment, each antenna section 40 may be 40 inches in length, 3.25 inches in width and 1.5 inch in thickness. In other embodiments, the antenna sections 40 may be larger or smaller as needed to support the desired footprint of the satellite antenna 30.

The antenna sections 40 include first and second antenna sections 40(1), 40(2) positioned between adjacent bulkheads 38. One end of the first antenna section 40(1) is pivotally coupled to one of the bulkheads 38, and one end of the second antenna section 40(2) is pivotally coupled to the adjacent bulkhead 38, as best shown in the deployed position in FIG. 2. A pair of rolling flex hinges 50 rotatably couple the first and second antenna sections 40(1), 40(2) together.

As will be explained in greater detail below, the rolling flex hinges 50 permit rotation of the first and second antenna sections 40(1), 40(2) between the stored position and the deployed position. The rolling flex hinges 50 advantageously lock in position without exceeding a final locked dimension to avoid overstretching components associated with the satellite antenna 30.

Even though the rolling flex hinge 50 is being discussed for a satellite antenna 30, this particular application is not to be limiting. The rolling flex hinge 50 may be used in other applications where a zero-overstretch hinge that locks on a center position is needed.

The rolling flex hinges 50 may also be referred to as latched joints when in the locked position. The first and second antenna sections 40(1), 40(2) are stacked in the stored position and are extended in end-to-end relation in the deployed position.

Figure 3:
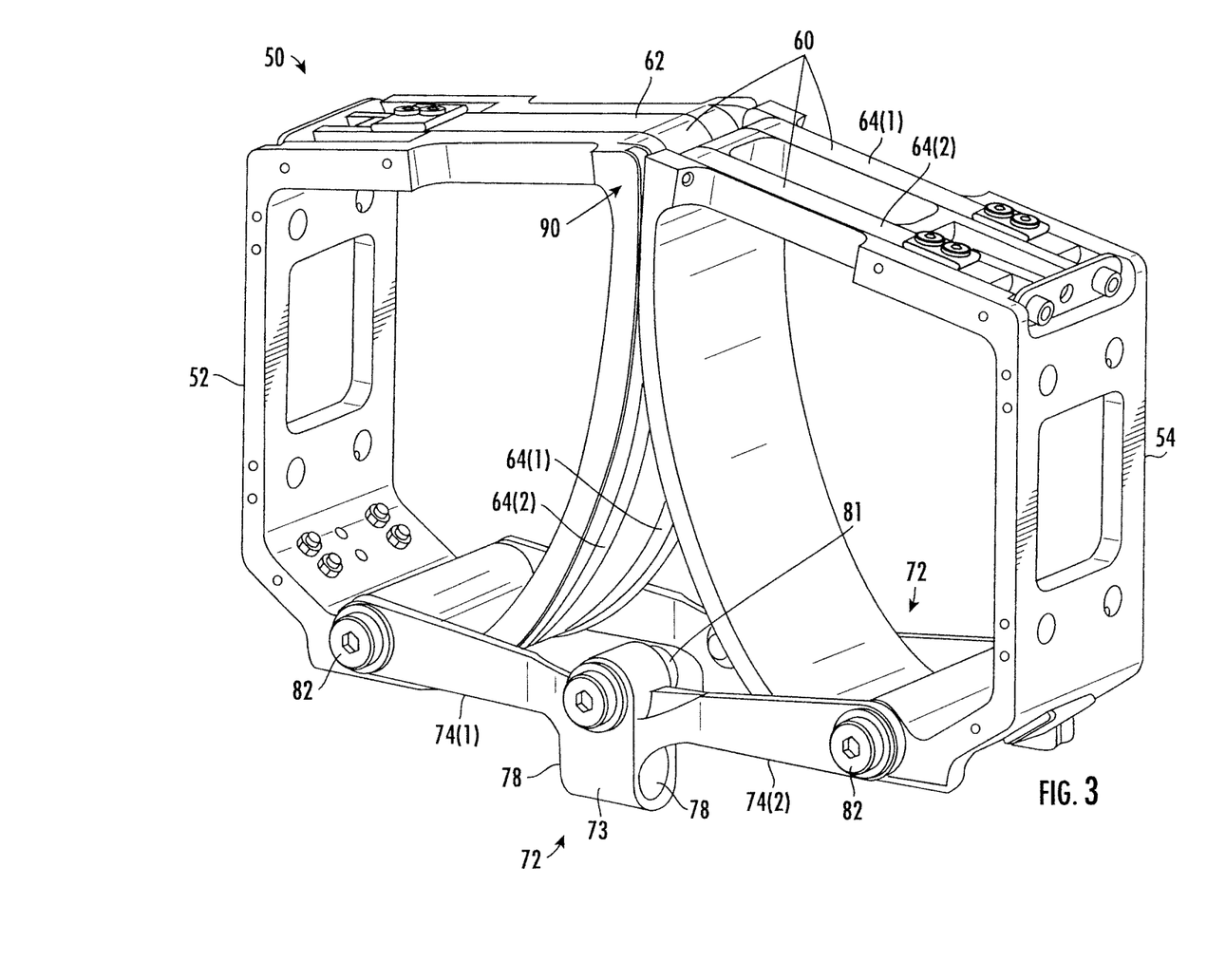
FIG. 3 is a perspective view of a rolling flex hinge used between antenna sections illustrated in FIGS. 1 and 2.

Referring now to FIG. 3, each rolling flex hinge 50 includes a first hinge body 52 to be coupled to an end of the first antenna section 40(1), and a second hinge body 54 to be coupled to an end of the second antenna section 40(2). A flexible strap arrangement 60 couples the first hinge body 52 and the second hinge body 54 together to permit rolling contact therebetween.

At least one locking linkage 72 is coupled between the first and second hinge bodies 52, 54 to lock the first and second hinge bodies when the first and second antenna sections 40(1), 40(2) are in the deployed position. In the illustrated embodiment, there is a pair of spaced apart locking linkages 72. Each locking linkage 72 is on a side of the first and second hinge bodies 52, 54 to stop rolling contact when in the deployed positon.

Each locking linkage 72 includes a first linkage 74(1) pivotally coupled to the first hinge body 52, and a second linkage 74(2) pivotally coupled to the second hinge body 54. The first and second linkages 74(1), 74(2) are pivotally coupled together.

A shoulder bolt 80 and nut 81 may be used to pivotally couple the first and second linkages 74(1), 74(2) together. Shoulder bolts 82 may be used to pivotally couple the first linkage 74(1) to the first hinge body 52 and to pivotally couple the second linkage 74(2) to the second hinge body 54.

Each locking linkage 72 includes magnets 78 so that the first and second linkages 74(1), 74(2) stop on center but still have a significant retaining force in the locked position. This helps to maintain an alignment positon between the first and second hinge bodies 52, 54 in the locked positon. Interface 73 is formed by respective surfaces of the first and second linkages 74(1), 74(2) when in the locked positon. The magnets 78 are positioned to make contact or couple together when the interface 73 is formed.

Figure 4:
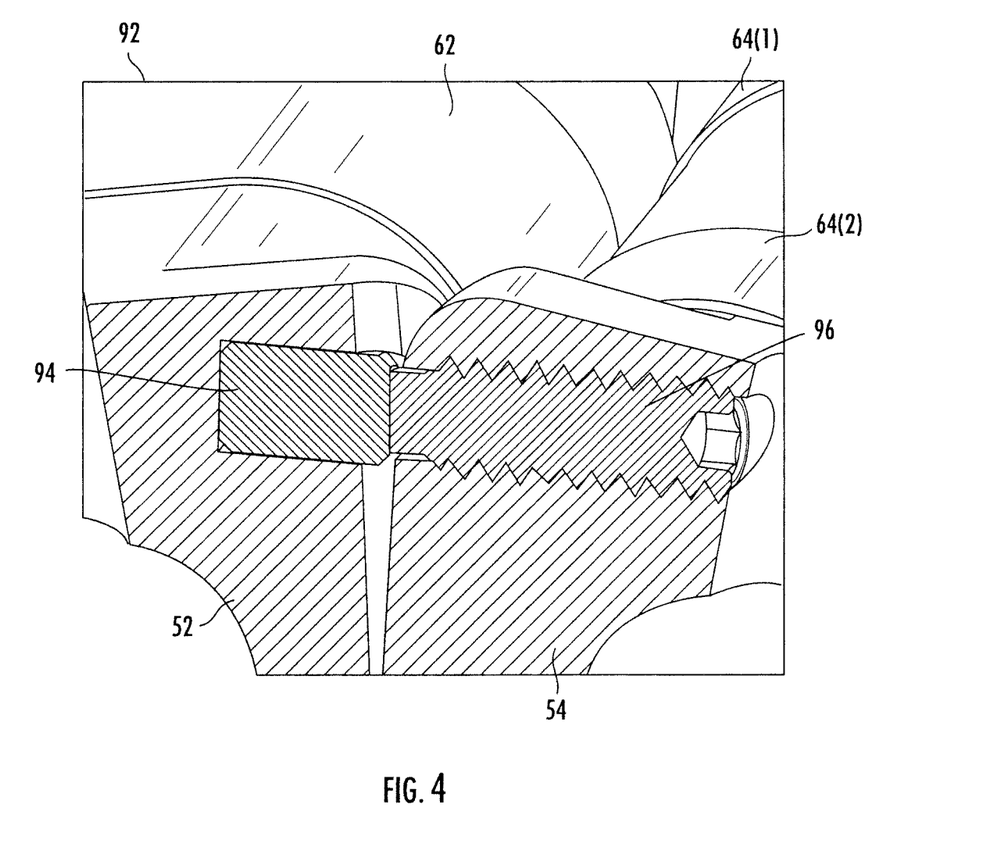
FIG. 4 is an enlarged cross-sectional view of the hard stop for the rolling flex hinge illustrated in FIG. 3.

Each rolling flex hinge 50 includes an adjustable hard stop 90 at the top of the rolling surface between the first and second hinge bodies 52, 54. The hard stop 90 may also be referred to as a stop. An enlarged cross-sectional view 92 of the hard stop 90 is illustrated in FIG. 4.

The hard stop 90 is configured to stop the rolling contact between the first and second hinge bodies 52, 54 when the first and second hinge bodies are in the locked positon. The locking linkages 72 in the locked positon advantageously provide a wide base for bending loads through the rolling flex hinge 50 when opposed with the hard stop 90.

In the illustrated embodiment, the hard stop 90 includes a dowel pin 94 carried by a rolling surface of the first hinge body 52. A set screw 96 is carried by a rolling surface of the second hinge body 54. The set screw 96 contacts the dowel pin 94 when the first and second antenna sections 40(1), 40(2) are in the deployed position. The set screw 96 is movable to adjust stoppage of the rolling contact between the first and second hinge bodies 52, 54. The hard stop 90 as illustrated is not to be limiting as other hard stop arrangements may be used for stoppage of the rolling contact between the first and second hinge bodies 52, 54.

Referring back to the rolling flex hinge 50 illustrated in FIG. 3, the flexible strap arrangement 60 includes a plurality of flexible straps 62, 64(1), 64(2) coupled between the first and second hinges 52, 54. The rolling flex hinge 50 has a curved interface surface between the first and second hinge bodies 52, 54 such that the hinges roll past each other.

The flexible straps 62, 64(1), 64(2) are positioned within grooves on the curved interface surface. This forms tracks on either side of each hinge body 52, 54. The tracks with the flexible straps 62, 64(1), 64(2) provide an interface for the rolling contact between the first and second hinge bodies 52, 54. In addition, the tracks also provide alignment between the first and second hinge bodies 52, 54. The grooves allow the flexible straps 62, 64(1), 64(2) to be recessed while permitting rolling contact between the first and second hinge bodies 52, 54. The flexible straps 62, 64(1), 64(2) prevent the first and second hinge bodies 52, 54 from separating.

The flexible straps 62, 64(1), 64(2) may also be referred to as tensioning straps. In one embodiment, stainless spring steel may be used for the tensioning straps.

Connection of the flexible straps 64(1), 64(2) will be discussed in greater detail with reference to FIGS. 5 and 6. In the flexible strap arrangement 60, flexible strap 62 is configured as a single wide strap, and flexible straps 64(1), 64(2) are configured as a pair of spaced apart narrow straps. The flexible straps 62, 64(1), 64(2) are positioned to be non-overlapping. In other embodiments, the wide flexible strap 62 may also be configured as a pair of narrow straps, for example.

Figure 5:
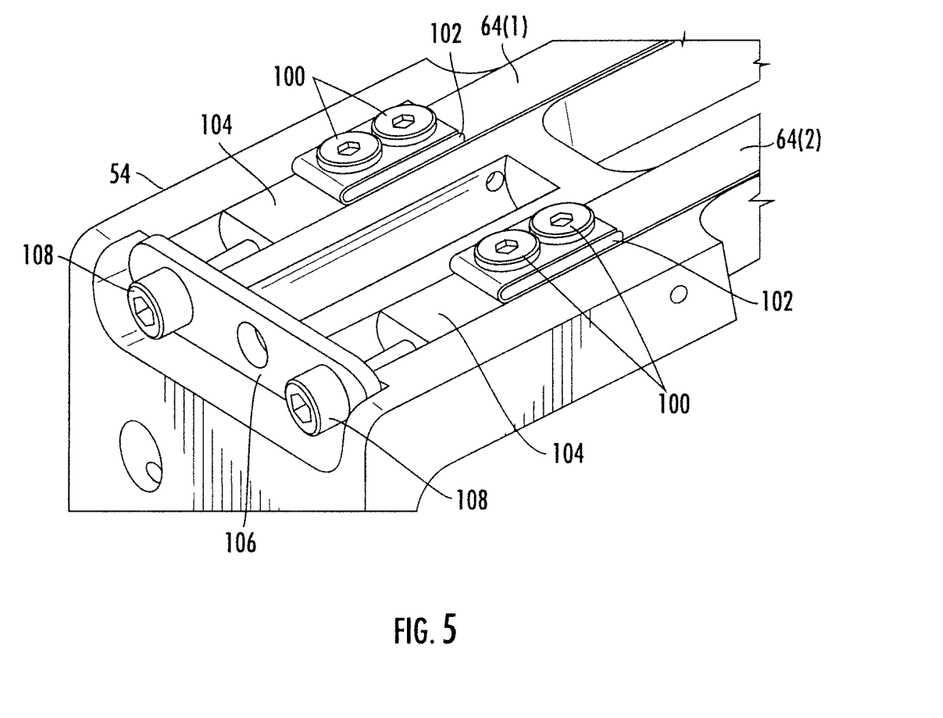
FIG. 5 is a partially enlarged top view of the flexible straps illustrated in FIG. 3 connected to the second hinge body of the rolling flex hinge.

Connection of the flexible straps 64(1), 64(2) to the second hinge body 54 is shown in FIG. 5. A pair of shoulder bolts 100 are used to secure ends of the flexible straps 64(1), 64(2) to the second hinge body 54. The ends of the flexible straps 64(1), 64(2) wrap around respective plate washers 102.

Figure 6:
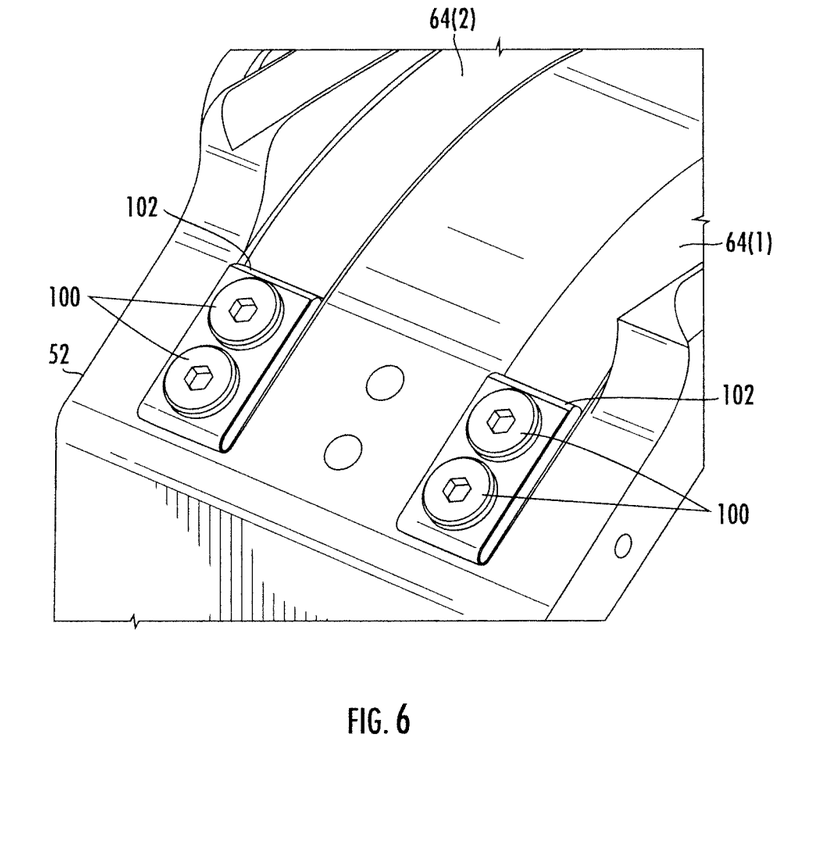
FIG. 6 is a partially enlarged bottom view of the flexible straps illustrated in FIG. 3 connected to the first hinge body of the rolling flex hinge.

Connection of the flexible straps 64(1), 64(2) to the first hinge body 52 is shown in FIG. 6. A pair of shoulder bolts 100 are used to secure ends of the flexible straps 64(1), 64(2) to the first hinge body 52. The ends of the flexible straps 64(1), 64(2) also wrap around respective plate washers 102.

With the flexible straps 64(1), 64(2) coupled to the first and second hinge bodies 52, 54, tension of the flexible straps 64(1), 64(2) may be adjusted using tensioning bolts 108. The tensioning bolts 108 extend through a plate washer 106 and into tensioning blocks 104 that are associated with ends of the flexible straps 64(1), 64(2). Connection of flexible strap 62 to the first and second hinge bodies 52, 54 is similar to that of flexible straps 64(1), 64(2).

Figure 7A:
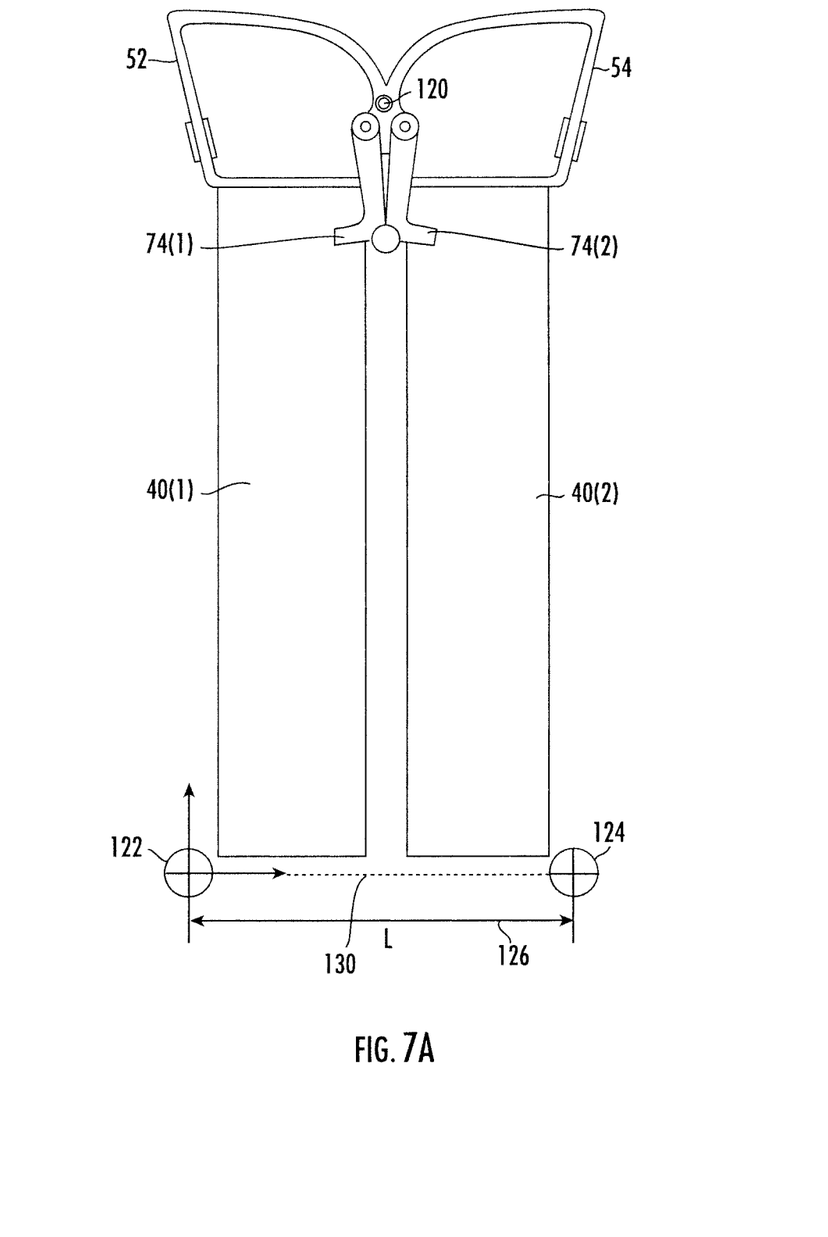
FIGS. 7A-7C are views of the rolling flex hinge illustrated in FIG. 3 coupled to first and second antenna sections in various deployment positions.
Figure 7B:
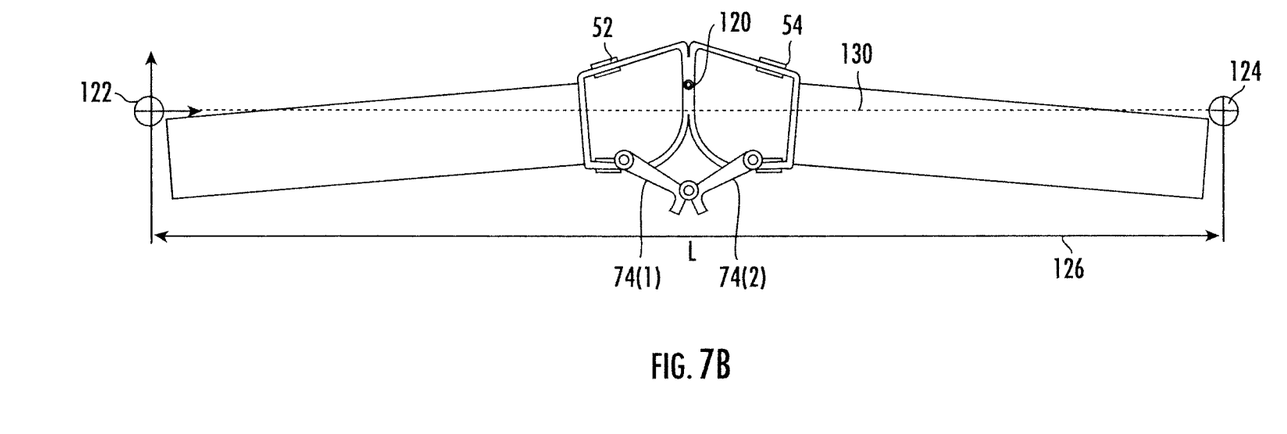
Figure 7C:
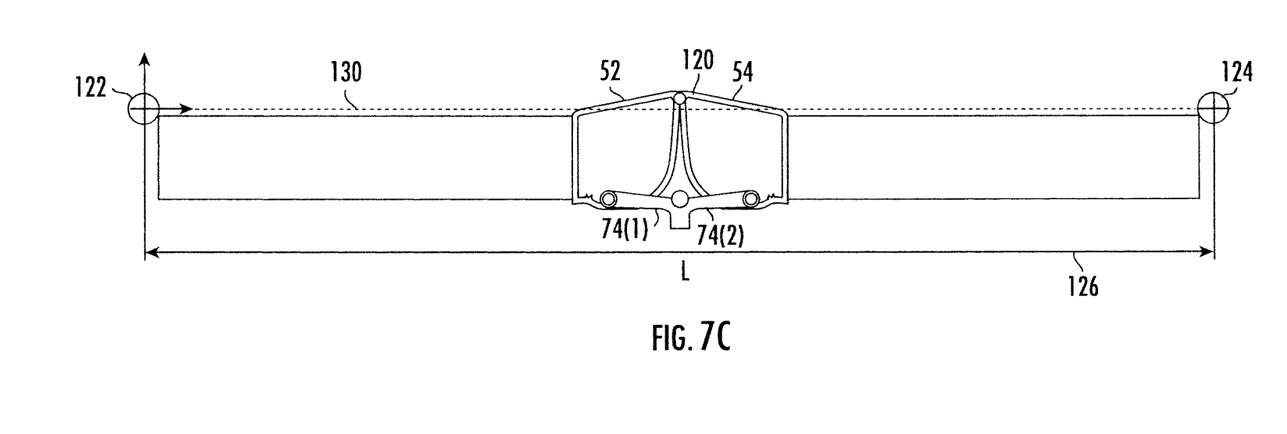

Referring now to FIGS. 7A-7C, different deployment positions of the first and second antenna panels 40(1), 40(2) will be discussed in relation to a deployment axis 130 and a mid-hinge contact point 120 of the rolling flex hinge 50. The deployment axis 130 extends between adjacent bulkheads 38, and is defined by the connection points 122 of the first and second antenna panels 40(1), 40(2) to the respective bulkheads 78. The mid-hinge contact point 120 is the point of contact between the first and second hinge bodies 52, 54 during rotation of the rolling flex hinge 50.

In order to avoid over stretching of the components of the satellite antenna 30 when in the deployed position, the mid-hinge contact point 120 needs to stay above the deployment axis 130. The deployment axis 130 remains the same in the different deployment positions. However, the deployment length 126 changes in the different deployment positions.

The antenna panels 40(1), 40(2) are in the stored position in FIG. 7A. The mid-hinge contact point 120 is a maximum distance from the deployment axis 130 in the stored position, whereas the deployment length 126 is at a minimum in the stored position.

As the antenna panels 40(1), 40(2) are moved towards the deployment positon, the mid-hinge contact point 120 moves closer to the deployment axis 130. The antenna panels 40(1), 40(2) are very close to the deployed position in FIG. 7B. In this position, movement of the antenna panels 40(1), 40(2) is about 95% of the deployed position. The mid-hinge contact point 120 remains above the deployment axis 130.

The antenna panels 40(1), 40(2) are 100% deployed in FIG. 7C. The deployment length 126 is at a maximum, and the mid-hinge contact point 120 is at a minimum but still above the deployment axis 130. Since the mid-hinge contact point 120 does not cross the deployment axis 130, a zero-over stretch condition for the rolling flex hinge 50 is met. This means the maximum deployment length 126 occurs at 100% deployment of the first and second antenna panels 40(1), 40(2).

Figure 8:
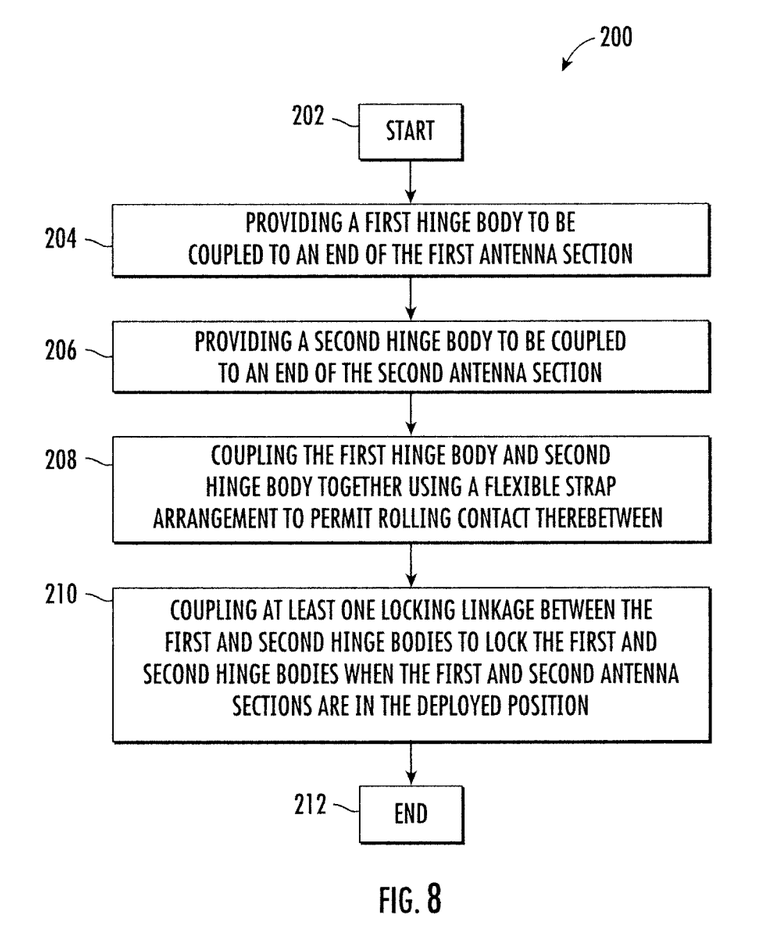
FIG. 8 is a flow diagram on a method for making the rolling flex hinge illustrated in FIG. 3.

Referring now to FIG. 8, a flow diagram 200 on a method for making the rolling flex hinge 50 for the spaceborne antenna 30 will be discussed. From the start (Block 202), the method includes providing a first hinge body 52 to be coupled to an end of the first antenna section 40(1) at Block 204, and providing a second hinge body 54 to be coupled to an end of the second antenna section 40(2) at Block 206.

The first hinge body 52 and second hinge body 54 are coupled together at Block 208 using a flexible strap arrangement 60 to permit rolling contact therebetween. The first and second hinge bodies 52, 54 may be coupled together before being connected to the first and second antenna sections 40(1), 40(2). The first and second antenna sections 40(1), 40(2) are stacked in the stored position and are extended in end-to-end relation in the deployed position. At least one locking linkage 72 is coupled between the first and second hinge bodies 52, 54 at Block 210 to lock the first and second hinge bodies 52, 54 when the first and second antenna sections 40(1), 40(2) are in the deployed position. The method ends at Block 212.

The rolling flex hinge 50 is not limited to spaceborne antennas 30. In addition to deployable antenna panels 40(1), 40(2), other types of spaceborne elements may be used with the rolling flex hinge 50. The deployable elements may be solar panel sections or optical reflector panel sections, for example.

The rolling flex hinge 50 permits rotation of first and second elements between a stored position and a deployed position. The first and second elements may need to be stiff in their deployed shape to allow spacecraft maneuvering and maintain a precise geometry. Cords 32 may be used between rigid structures to form tension truss structures that are both stiff and very lightweight. The rolling flex hinge 50 advantageously deploys and locks in position the first and second elements without exceeding a final locked dimension to avoid overstretching the tension truss structures.

In addition to spaceborne applications, the rolling flex hinge 50 may be used in terrestrial applications. The rolling flex hinge 50 may be used between two rotating elements that lock between a fixed constraint. The fixed constraint may be concrete walls, for example, and the rotating elements are rigid as well. The rotating elements may be first and second wood posts, for example, that are rotated from a stored position to a deployed position between the concrete walls. Since the concrete walls are too stiff to move out of the way and the first and second wood posts are too stiff to compress or shrink, the rolling flex hinge 50 ensures that deployment of the first and second wood posts are not overextended between the concrete walls. Other types rotating elements may be used.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A spaceborne antenna for a satellite comprising:
a plurality of antenna sections for the satellite; and
at least one rolling flex hinge rotatably coupling first and second antenna sections together and permitting rotation between a stored position and a deployed position, the first and second antenna sections being stacked in the stored position and extended in end-to-end relation in the deployed position, the at least one rolling flex hinge comprising
a first hinge body coupled to an end of the first antenna section,
a second hinge body coupled to an end of the second antenna section,
a flexible strap arrangement coupling the first hinge body and second hinge body together to permit rolling contact therebetween, the flexible strap arrangement comprising at least one flexible strap having opposing ends fixed to respective ones of the first and second hinge bodies, and
at least one locking linkage coupled between the first and second hinge bodies to lock the first and second hinge bodies when the first and second antenna sections are in the deployed position.

2. The spaceborne antenna according to claim 1 wherein the at least one locking linkage comprises a plurality of spaced apart locking linkages, with each locking linkage comprising:
a first linkage pivotally coupled to the first hinge body;
a second linkage pivotally coupled to the second hinge body; and
the first and second linkages being pivotally coupled together.

3. The spaceborne antenna according to claim 2 wherein each locking linkage comprises:
a first magnet carried by the first linkage;
a second magnet carried by the second linkage; and
the first and second magnets coupling together to lock the first and second hinge bodies when the first and second antenna sections are in the deployed position.

4. The spaceborne antenna according to claim 1 wherein the at least one rolling flex hinge comprises a stop to stop the rolling contact between the first and second hinge bodies when the first and second hinge bodies are locked.

5. The spaceborne antenna according to claim 4 wherein the stop comprises:
a dowel pin carried by a rolling surface of the first hinge body; and
a set screw carried by a rolling surface of the second hinge body.

6. The spaceborne antenna according to claim 1 wherein the at least one flexible strap comprises:
at least one first flexible strap coupled between the first and second hinge bodies; and
at least one second flexible strap coupled between the first and second hinge bodies and non-overlapping with the at least one first flexible strap.

7. The spaceborne antenna according to claim 6 wherein respective rolling surfaces of the first and second hinge bodies include grooves for receiving the at least one first and second flexible straps.

8. The spaceborne antenna according to claim 1 wherein the at least one rolling flex hinge comprises a plurality of spaced apart rolling flex hinges rotatably coupling the first and second antenna sections together.

9. A rolling flex hinge for a spaceborne antenna comprising first and second antenna sections, the rolling flex hinge permitting rotation of the first and second antenna sections between a stored position and a deployed position, comprising:
a first hinge body to be coupled to an end of the first antenna section;
a second hinge body to be coupled to an end of the second antenna section;
a flexible strap arrangement coupling the first hinge body and second hinge body together to permit rolling contact therebetween, the flexible strap arrangement comprising at least one flexible strap having opposing ends fixed to respective ones of the first and second hinge bodies, with the first and second antenna sections being stacked in the stored position and extended in end-to-end relation in the deployed position; and
at least one locking linkage coupled between the first and second hinge bodies to lock the first and second hinge bodies when the first and second antenna sections are in the deployed position.

10. The rolling flex hinge according to claim 9 wherein the at least one locking linkage comprises a plurality of spaced apart locking linkages, with each locking linkage comprising:
a first linkage pivotally coupled to the first hinge body;
a second linkage pivotally coupled to the second hinge body; and
the first and second linkages being pivotally coupled together.

11. The rolling flex hinge according to claim 10 wherein each locking linkage comprises:
a first magnet carried by the first linkage;
a second magnet carried by the second linkage; and
with the first and second magnets coupling together to lock the first and second hinge bodies.

12. The rolling flex hinge according to claim 9 comprises a stop to stop the rolling contact between the first and second hinge bodies when the first and second hinge bodies are locked.

13. The rolling flex hinge according to claim 12 wherein the stop comprises:
a dowel pin carried by a rolling surface of the first hinge body; and
a set screw carried by a rolling surface of the second hinge body.

14. The rolling flex hinge according to claim 9 wherein the at least one flexible strap comprises:
at least one first flexible strap coupled between the first and second hinge bodies; and
at least one second flexible strap coupled between the first and second hinge bodies and non-overlapping with the at least one first flexible strap.

15. The rolling flex hinge according to claim 14 wherein respective rolling surfaces of the first and second hinge bodies include grooves for receiving the at least one first and second flexible straps.

16. A method for making a rolling flex hinge for a spaceborne antenna comprising first and second antenna sections, the rolling flex hinge permitting rotation of the first and second antenna sections between a stored position and a deployed position, comprising:
coupling a first hinge body and a second hinge body together using a flexible strap arrangement to permit rolling contact therebetween, the flexible strap arrangement comprising at least one flexible strap having opposing ends fixed to respective ones of the first and second hinge bodies, the first hinge body to be coupled to an end of the first antenna section and the second hinge body to be coupled to an end of the second antenna section, and with the first and second antenna sections being stacked in the stored position and extended in end-to-end relation in the deployed position; and coupling at least one locking linkage between the first and second hinge bodies to lock the first and second hinge bodies when the first and second antenna sections are in the deployed position.

17. The method according to claim 16 wherein the at least one locking linkage comprises a plurality of spaced apart locking linkages, with each locking linkage comprising:
   a first linkage pivotally coupled to the first hinge body;
   a second linkage pivotally coupled to the second hinge body; and
   the first and second linkages being pivotally coupled together.

18. The method according to claim 17 wherein each locking linkage comprises a first magnet carried by the first linkage, a second magnet carried by the second linkage, and with the first and second magnets coupling together to lock the first and second hinge bodies.

19. The method according to claim 16 comprises providing a stop for the rolling flex hinge to stop the rolling contact between the first and second hinge bodies when the first and second hinge bodies are locked.

20. The method according to claim 16 wherein the at least one flexible strap comprises at least one first flexible strap coupled between the first and second hinge bodies, and at least one second flexible strap coupled between the first and second hinge bodies and non-overlapping with the at least one first flexible strap.

21. The method according to claim 20 wherein respective rolling surfaces of the first and second hinge bodies include grooves for receiving the at least one first and second flexible straps.

22. A rolling flex hinge for first and second panel sections, the rolling flex hinge permitting rotation of the first and second elements between a stored position and a deployed position, comprising:
   a first hinge body to be coupled to an end of the first element;
   a second hinge body to be coupled to an end of the second element;
   a flexible strap arrangement coupling the first hinge body and second hinge body together to permit rolling contact therebetween, the flexible strap arrangement comprising at least one flexible strap having opposing ends fixed to respective ones of the first and second hinge bodies, with the first and second elements being stacked in the stored position and extended in end-to-end relation in the deployed position; and
   at least one locking linkage coupled between the first and second hinge bodies to lock the first and second hinge bodies when the first and second elements are in the deployed position.

23. The rolling flex hinge according to claim 22 wherein the at least one locking linkage comprises a plurality of spaced apart locking linkages, with each locking linkage comprising:
   a first linkage pivotally coupled to the first hinge body;
   a second linkage pivotally coupled to the second hinge body; and
   the first and second linkages being pivotally coupled together.

24. The rolling flex hinge according to claim 23 wherein each locking linkage comprises:
   a first magnet carried by the first linkage;
   a second magnet carried by the second linkage; and
   with the first and second magnets coupling together to lock the first and second hinge bodies.

25. The rolling flex hinge according to claim 22 comprises a stop to stop the rolling contact between the first and second hinge bodies when the first and second hinge bodies are locked.

26. The rolling flex hinge according to claim 25 wherein the stop comprises:
   a dowel pin carried by a rolling surface of the first hinge body; and
   a set screw carried by a rolling surface of the second hinge body.

27. The rolling flex hinge according to claim 22 wherein the at least one flexible strap comprises:
   at least one first flexible strap coupled between the first and second hinge bodies; and
   at least one second flexible strap coupled between the first and second hinge bodies and non-overlapping with the at least one first flexible strap.

28. The rolling flex hinge according to claim 27 wherein respective rolling surfaces of the first and second hinge bodies include grooves for receiving the at least one first and second flexible straps.

* * * * *